(12) United States Patent
Furon et al.

(10) Patent No.: US 7,031,492 B1
(45) Date of Patent: Apr. 18, 2006

(54) DIGITAL DATA WATERMARKING SYSTEM USING NOVEL WATERMARK INSERTION AND DETECTION METHODS

(75) Inventors: Teddy Furon, Rennes (FR); Pierre Duhamel, Le Plessis Robinson (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/926,585

(22) PCT Filed: May 5, 2000

(86) PCT No.: PCT/EP00/04053

§ 371 (c)(1),
(2), (4) Date: Nov. 21, 2001

(87) PCT Pub. No.: WO00/74371

PCT Pub. Date: Dec. 7, 2000

(30) Foreign Application Priority Data

Jun. 1, 1999 (FR) .................................. 99 07139

(51) Int. Cl.
*G06K 9/00* (2006.01)
(52) U.S. Cl. ........................................ 382/100; 382/232
(58) Field of Classification Search ................ 382/100, 382/232; 380/51, 54, 201, 210, 252, 287; 713/176, 179; 370/522–529; 283/72, 74–81, 283/901, 902, 85, 93, 113; 375/130, 208; 358/3.28; 399/366; 704/200.1, 273; 725/9, 725/20, 22; 705/57, 58
See application file for complete search history.

(56) References Cited

U.S. PATENT DOCUMENTS

| 4,661,948 | A | | 4/1987 | Shapiro et al. |
| 4,977,578 | A | * | 12/1990 | Ishigaki et al. ............. 375/140 |
| 5,450,453 | A | * | 9/1995 | Frank ......................... 375/130 |
| 5,499,294 | A | | 3/1996 | Friedman ..................... 380/10 |
| 5,748,783 | A | | 5/1998 | Rhoads ....................... 382/232 |
| 5,901,178 | A | * | 5/1999 | Lee et al. .................... 375/240 |
| 6,353,637 | B1 | * | 3/2002 | Mansour et al. ............ 375/260 |
| 6,359,998 | B1 | * | 3/2002 | Cooklev ..................... 382/100 |
| 6,363,381 | B1 | * | 3/2002 | Lee et al. ....................... 707/6 |
| 6,499,128 | B1 | * | 12/2002 | Gerlach et al. ............. 714/755 |
| 6,504,941 | B1 | * | 1/2003 | Wong ......................... 382/100 |
| 6,801,999 | B1 | * | 10/2004 | Venkatesan et al. ........ 713/167 |
| 6,819,708 | B1 | * | 11/2004 | Lim et al. ................... 375/146 |

FOREIGN PATENT DOCUMENTS

| EP | 0766468 | 4/1997 |
| EP | 0828372 | 3/1998 |
| EP | 0840513 | 5/1998 |

* cited by examiner

*Primary Examiner*—Jingge Wu
*Assistant Examiner*—Abolfazl Tabatabai
(74) *Attorney, Agent, or Firm*—Joseph S. Tripoli; Robert D. Shedd; Paul P. Kiel

(57) ABSTRACT

The watermarking system uses a first series of parameters, the private key, for the insertion of the watermark, and a second series of parameters, the public key, for the detection of the watermark, so that knowledge of the public key does not make it possible to know the private key and does not make it possible to delete or modify the watermark. The insertion of the watermark is performed by adding a pseudo random noise sequence, filtered by a filter with impulse response, to the data to be watermarked. The detection of the watermark is performed by searching through the data received for whether they contain noise which has been filtered by a filter with predefined spectral response. Application to copy protection.

10 Claims, 4 Drawing Sheets

DIGITAL DATA WATERMARKING SYSTEM USING NOVEL WATERMARK INSERTION AND DETECTION METHODS

This application claims the benefit, under 35 U.S.C. § 365 of International Application PCT/EP00/04053, filed May 5, 2000, which was published in accordance with PCT Article 21(2) on Dec. 7, 2000 in English and which claims the benefit of French patent application No. 9907139 filed Jun. 1, 1999.

BACKGROUND OF THE INVENTION

The present invention relates to the field of watermarking of digital data. It relates more particularly to a system for watermarking data using novel watermark insertion and detection methods as well as to devices for implementing these methods.

RELATED ART

Recent methods for protecting against the illicit copying of digital data use the principle of data watermarking which consists in inserting a marking item, commonly referred to as a "watermark", into a multimedia content (still image, video, sound, etc.) in an imperceptible manner. The watermark can for example be a signal indicating that the content may not be copied or any other item allowing the supplier of the multimedia content to detect illegal copies.

In order to play its role perfectly, the watermark must be robust to transformations of the watermarked content, whether these transformations be made intentionally by a pirate who wishes to erase the watermark, or whether they result from distortions which occurred during the transmission of the signal containing the watermarked data.

Various data watermarking techniques are known from the prior art. Reference may in particular be made to the documents EP-A-0 828 372, EP-A-0 840 513, WO-A-98/03014 or WO-A-98/54897 which describe methods for inserting watermarks into data to be protected and methods for detecting the presence of such watermarks in the data.

A scheme which is generally used to describe the principle of data watermarking is that of FIG. 1. A first part 1 relates to the insertion of a hidden item W (the watermark) into a content to be protected C. This results in a watermarked content CT. Part 2 relates to the detection of the presence of the item W in the content received CT. An additional datum K is also necessary in the process for inserting and detecting the watermark. This datum K which must be shared in a secret manner by the device for inserting and detecting the watermark is referred to as the key by analogy with so-called symmetric or private-key cryptography systems.

For example, a known watermarking technique consists in adding a pseudo random noise sequence to data which are to be watermarked. The detection process is carried out, in this case, by performing a correlation calculation: the data received are declared watermarked if the correlation with the reference pseudo noise sequence (used for the insertion of the watermark) is greater than a given threshold. In this example, the reference pseudo noise sequence constitutes the key K of the data watermarking scheme of FIG. 1.

The problem with this scheme is that each entity capable of detecting the watermark must share the same key K as the entity which inserted the watermark. In this case, the entity capable of detecting the watermark can furthermore delete it or modify it, thereby doing away with all the benefit of the initial watermarking of the data. Consequently, a supplier of content protected by watermarking should not communicate his key K, which served for the insertion of the watermark, other than in a secret manner to trusted entities. This considerably limits the possibilities of using data watermarking in numerous fields.

In particular, in the field of consumer electronic appliances, it is well known that it is almost impossible, at any event at reasonable cost, to store secret parameters in an appliance or in software contained in such an appliance. Smart cards, which are regarded as the only pieces of equipment allowing the secure storage of a secret parameter, are not themselves powerful enough to perform the calculations connected with a watermark detection process.

In the example described above where the watermarking is carried out by adding a pseudo random noise sequence to the data which are to be watermarked, even if the reference pseudo noise sequence is stored secretly in the watermark detection device, it has been demonstrated that a pirate can theoretically discover the reference sequence and thus delete the watermark from the data by observing the output from the detector as a function of a large number of different input signals.

BRIEF SUMMARY OF THE INVENTION

The invention aims to solve the aforesaid problems.

To this end, the invention relates to a method for inserting a watermark into data representing a content to be protected. According to the invention, the method comprises the steps consisting in:

a) supplying a pseudo random noise sequence to the input of a filter with predefined impulse response; and b) adding the filtered pseudo noise sequence to the data.

According to a preferred aspect of the invention, the method furthermore comprises the steps consisting in:

c) performing a pseudo random interleaving of the data before step b); and d) performing an inverse interleaving after step b) so as to obtain the watermarked data.

The invention also relates to a method for detecting a watermark in data representing a content received, characterized in that it comprises the steps consisting in:

i) performing a spectral analysis of the data; and ii) deducing therefrom whether the data include a pseudo noise sequence which has been filtered by a filter with predefined spectral response.

According to another preferred aspect of the invention, a pseudo random interleaving of the data received, which is identical to the interleaving performed in step c) above, is performed before step i).

The invention also relates to a system for watermarking data using a watermark insertion method and a watermark detection method as those above. According to the invention, a first series of parameters, the private key, is used for the insertion of the watermark and a second series of parameters, the public key, is used for the detection of the watermark, so that:

knowledge of the public key does not make it possible to know the private key; and knowledge of the method of detection and of the public key does not make it possible to delete or modify the watermark.

The invention also relates to a device for inserting a watermark into data representing a content to be protected. According to the invention, the device comprises:

means for generating a pseudo random noise sequence;

filtering means having a predefined impulse response and which are adapted for receiving the pseudo noise sequence and for supplying a filtered pseudo noise sequence; and means for adding the filtered pseudo noise sequence to the data.

According to a preferred embodiment of the invention, the device furthermore comprises:

first means of pseudo random interleaving of the data representative of the content to be protected so as to supply interleaved data, the interleaved data being supplied to the addition means so as to be added to the filtered pseudo noise sequence; and means of inverse interleaving of the first interleaving means, linked to the output of the said addition means so as to supply the watermarked data.

According to a particular embodiment of the invention, the device comprises:

means for transforming the content to be protected into data representative of the content;

means for generating a modulation sequence indicative of the maximum amount of noise which can be added to the data;

first means of pseudo random interleaving of the data representative of the content to be protected so as to supply interleaved data;

second means of pseudo random interleaving, which are identical to the first adapted for receiving the modulation sequence so as to supply an interleaved modulation sequence;

multiplication means adapted for receiving, on the one hand the interleaved modulation sequence, and on the other hand the filtered pseudo noise sequence, so as to supply the watermark;

means of addition of the interleaved data and of the watermark, the output of the addition means being linked to:

means of inverse interleaving of the first and second interleaving means so as to supply the watermarked data; and means of inverse transformation of the watermarked data into a marked content.

The invention also relates to a device for detecting a watermark in data representing a content received. According to the invention, the device comprises:

means for estimating the power spectral density of the data; and means of likelihood testing of hypotheses so as to estimate whether the data include a pseudo noise sequence which has been filtered by a filter with predefined spectral response.

According to a particular embodiment, the device furthermore comprises:

means of pseudo random interleaving of the data representing the content received, which are adapted for performing the same interleaving as the first interleaving means of the insertion device, the interleaved data being supplied to the means for estimating the power spectral density.

According to another particular embodiment, the device furthermore comprises:

means for transforming the content received into data representative of the content, the transforming means being adapted for performing the same transformation as the transforming means of the insertion device.

BRIEF DESCRIPTION OF THE DRAWING

Other characteristics and advantages of the invention will become apparent on reading the following description of a particular embodiment, which is non-limiting, of the invention given with reference to the appended figures, among which.

DETAILED DESCRIPTION OF THE INVENTION

Figure 1:
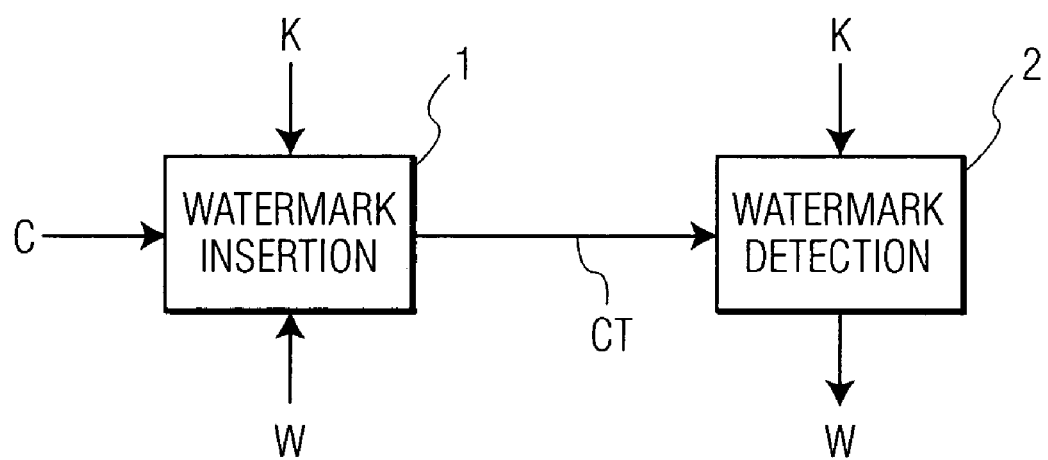
FIG. 1, described previously, illustrates a known scheme for watermarking digital data.
Figure 2:
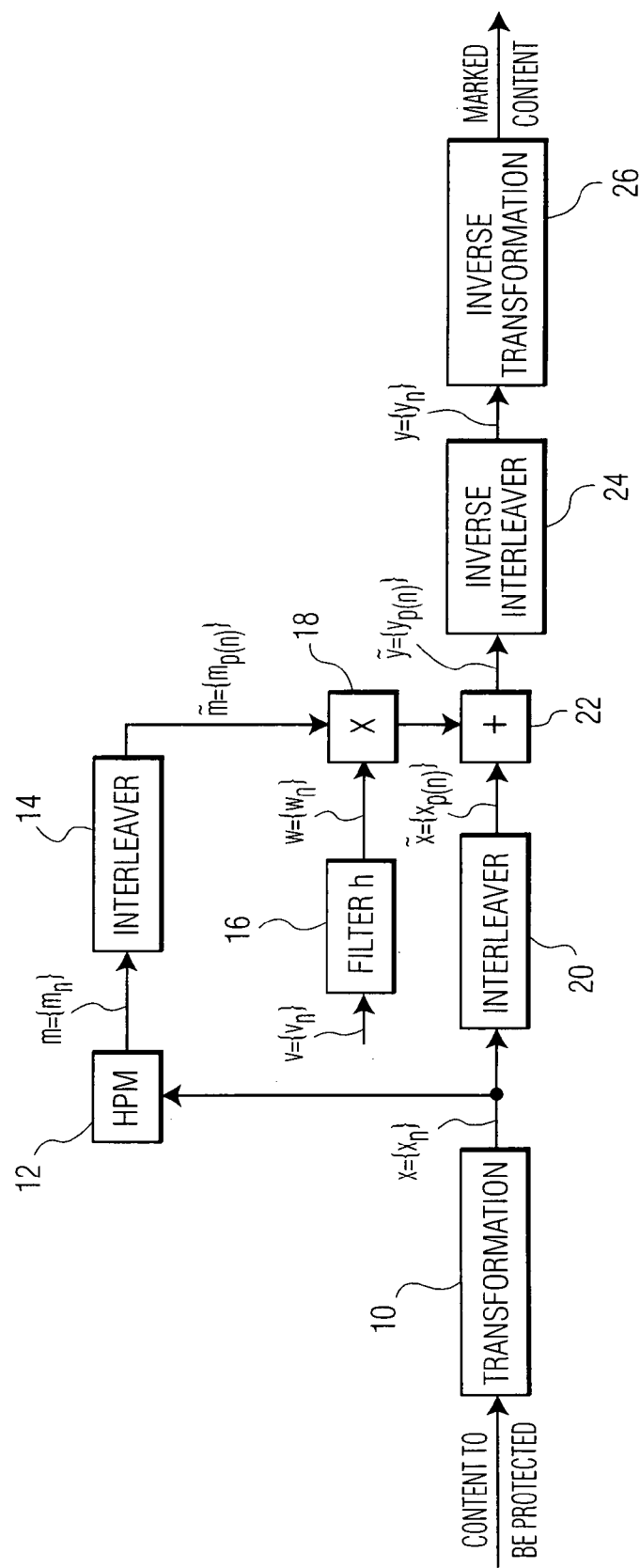
FIG. 2 schematically represents a watermark insertion device according to the invention.

Represented schematically in FIG. 2 is a device according to the invention for inserting a watermark into a signal representative of a content to be protected. This signal can in particular be a digital video or audio signal or else a signal representing a still image such as a photograph or a computer-calculated synthetic image, or more generally, any signal representing a multimedia content.

Firstly, the content to be protected is transformed by a transformation module 10 into a sequence of digital data $x=\{x_n\}$, n lying between 1 and N. For example, if the content to be protected is an image comprising N pixels, the coefficients $x_n$ can correspond to the luminance of each pixel of the image. These may also be coefficients of a Discrete Fourier Transform of the signal representing the content to be protected, or else coefficients of a Fourier-Mellin Transform or coefficients of a wavelet decomposition when the content to be protected is a still image.

The data sequence x representing the content to be protected is transmitted on the one hand to a module HPM 12 which outputs a modulation sequence $m=\{m_n\}$, $\forall n \in [1 \ldots N]$. The module HPM calculates this modulation sequence as a function of algorithms based on human perception models, such as Sarnoff's model of the eye. This sequence $m=\{m_n\}$ represents the maximum amount of noise which can be added to each coefficient $x_n$ without perceptible loss of quality.

According to one aspect of the invention, the data sequence x is transmitted moreover to an interleaver 20, which performs a random permutation p of the coefficients $x_n$ so as to supply a sequence of interleaved coefficients $\tilde{x}=\{x_{p(n)}\}$. The purpose of this interleaving of the data sequence x will be explained subsequently.

The modulation sequence m is also transmitted to an interleaver 14 which performs the same permutation p of the coefficients $m_n$ as that performed by the interleaver 20 so as to output an interleaved modulation sequence $\tilde{m}=\{m_{p(n)}\}$.

In order to constitute the watermark which will be inserted into the data sequence x representing the content to be protected, a pseudo random noise generator (not represented) firstly supplies a pseudo noise sequence $v=\{v_n\}$, $\forall n \in [1 \ldots N]$, with Gaussian distribution. This pseudo noise sequence v is transmitted to the input of a filter 16, of Linear Time Invariant (LTI) type, whose impulse response is:

$h=\{h_n\}$, $\forall n \in [1 \ldots L]$ where L is an integer corresponding to the length of the filter;

and whose spectral response is H(f), H(f) being the Fourier Transform of h.

At the output of the filter 16 one obtains a filtered pseudo noise sequence w={$w_n$}, ∀n ∈[1 ... N]satisfying the following equation (1):

$$w_n = \sum_{k=1}^{L} v_{n-k} \cdot h_k = h_n \otimes v_n \ \forall n \in [1 \ldots N] \quad (1)$$

in which represents the convolution product.

From this may be deduced, from the interference theorem, the following two equations (2) and (3):

$$\phi_{ww}(\tau)=(hh)\phi_{vv}(\tau) \quad (2)$$

in which $\phi_{ww}(\tau)$ and $\phi_{vv}(\tau)$ respectively represent the auto-correlation functions of w and of v; and $$\Phi_{ww}(f)=|H(f)|^2 \cdot \Phi_{vv}(f) \quad (3)$$

in which $\Phi_{ww}(f)$ and $\Phi_{vv}(f)$ respectively represent the power spectral densities of $\phi_{ww}(\tau)$ and $\phi_{vv}(\tau)$ that is to say their Fourier Transforms.

Since v is a pseudo random noise sequence with Gaussian distribution, its spectrum, that is to say the function $\Phi_{vv}(f)$, has a substantially flat shape. On the other hand, once this sequence v is filtered by the filter 16, the resulting sequence w exhibits a spectrum $\Phi_{ww}(f)$ which is no longer flat on account of the term $|H(f)|^2$. It is also important to note, so as to comprehend the rest of the invention, that knowledge of $|H(f)|^2$ (and by the same token, knowledge of the modulus of H(f): |H(f)|) does not make it possible to retrieve H(f) (and hence h) since there is an uncertainty with regard to the phase of H(f).

Returning to FIG. 2, the filtered pseudo noise sequence w is multiplied (multiplier 18) by the interleaved modulation sequence m̃ and the resulting sequence, which constitutes the watermark, is added (adder 22) to the sequence of interleaved data x̃.

The output sequence from the adder 22 is denoted ỹ={$y_{p(n)}$} and satisfies the following equations (4) and (5):

$$y_{p(n)}=x_{p(n)}+m_{p(n)} \cdot (h_n v_n) \quad (4)$$

$$\tilde{y}=\tilde{x}+\tilde{m} \cdot (hv) \quad (5)$$

The power spectral density of the sequence of watermarked interleaved data ỹ is given by the following equations (6) and (7):

$$\Phi_{\tilde{y}\tilde{y}}(f)=\Phi_{\tilde{x}\tilde{x}}(f) \cdot \Phi_{\tilde{m}\tilde{m}}(f) \cdot \Phi_{hv}(f) \quad (6)$$

$$\Phi_{\tilde{y}\tilde{y}}(f) = (\mu_x^2 \cdot \delta(f) + \sigma_x^2) + \left(\sigma_m^2 \cdot \sigma_v^2 \cdot \sum_u h_u^2\right) + \mu_m^2 \cdot \sigma_v^2 \cdot |H(f)|^2 \quad (7)$$

In equation (7), $\mu_j$ and $\sigma_j$ respectively represent the mean and the standard deviation of the sequence j={$j_n$} with j ∈ {x, m, v}, δ(f) corresponds to the Dirac pulse and the expression $$\left(\sigma_m^2 \cdot \sigma_v^2 \cdot \sum_u h_u^2\right)$$

is equal to a constant.

The sequence of watermarked interleaved data ỹ is then transmitted to an inverse interleaver 24 which performs the operation inverse to the permutation p performed by the interleavers 20 and 14 so as to supply a sequence of watermarked data y={$y_n$} whose coefficients are in the same order as the initial order of the data x={$x_n$}.

A transformation inverse to that performed by the transformation module 10 is then performed by the module 26 so as to obtain the marked content (or watermarked content) which is thus protected against illicit copying without the watermark being perceptible within the content.

Figure 3:
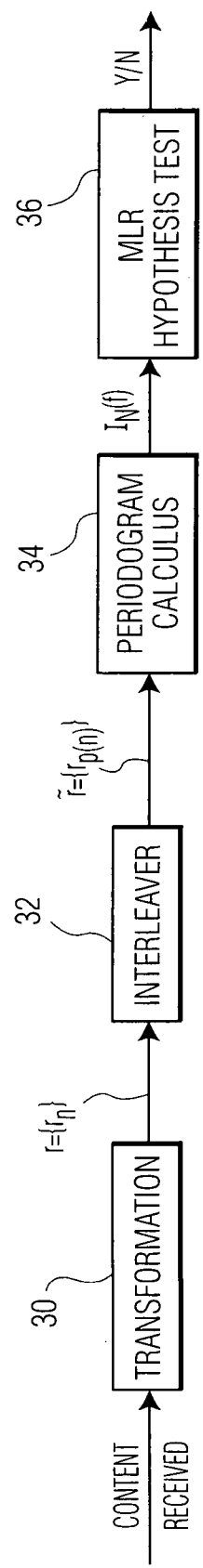
FIG. 3 schematically represents a watermark detection device according to the invention.

We shall now describe, in conjunction with FIG. 3, a device for detecting a watermark in a received content when this watermark has been inserted into a content to be protected by a device such as that of FIG. 2.

The principle of the detection is based on the spectral analysis of the signal received.

The signal received is representative of the received content for which one will seek to determine whether or not it is watermarked. This content is of the same type as the content to be protected described previously. In the example which follows, it will be assumed that the content received is an image containing N pixels.

The content received is firstly transmitted to a transformation module 30 which performs the same transformation operation as the module 10 of the watermark insertion device of FIG. 2 so as to supply a data sequence r={$r_n$}, ∀n ∈ [1 ... N] representing the content received. In our example, it is assumed that the luminances $r_n$ of the pixels of the image received are obtained as output from the transformation module 30.

If the content received were to correspond exactly to the watermarked content emanating from the device of FIG. 2, that is to say if no transformation or distortion of the signal had taken place during transmission between the watermark insertion device and the detection device, then one would have:

$$r=\{r_n\}=y=\{y_n\}$$

In practice, this is not always the case since the signal sometimes undergoes transformations during its transmission.

Since the watermark has been inserted, in the device of FIG. 2, into a sequence of interleaved data x̃, the data sequence r will, in order to detect the possible presence of a watermark in the content received, be transmitted to an interleaver 32 performing the same permutation p of the coefficients $r_n$ as that performed by the interleavers 20 and 14 of FIG. 2.

A sequence of interleaved data r̃={$r_{p(n)}$} is obtained as output from the interleaver 32.

It was seen previously that when the watermark inserted is a pseudo noise sequence filtered by a filter with impulse response h and with spectral response H(f), the power spectral density of the (interleaved) data obtained ỹ is expressed by relations (6) and (7).

The purpose of the interleaving of the data sequence x and of the modulation sequence m will now be apparent. Indeed, if the data sequence x represents the pixels of an image, its spectral density has a very structured shape with very large amplitude differences. The role of the interleaving of the data is to sever the statistical coherence of this sequence so that the spectral density of the sequence of interleaved data x̃ has a substantially flat shape, such as that of a pseudo noise sequence with Gaussian distribution.

Thus, if a watermark consisting of a pseudo noise sequence filtered by a filter with spectral response H(f) is added to this interleaved sequence, a data sequence is obtained whose power spectral density can be expressed by relation (7) in which the significant term $|H(f)|^2$ can be detected.

The principle of the detection will therefore be based on the spectral analysis of the sequence $\tilde{r}$ and on a Maximum Likelihood Ratio Hypothesis test (MLR Hypothesis test), the hypothesis tested being the following: if the sequence of interleaved data $\tilde{r}$ contains noise, is it noise which has been filtered by a filter whose spectral response has a modulus similar to $|H(f)|$? If the response is yes, one will deduce from this that the noise present in the sequence $\tilde{r}$ is a watermark and, in the contrary case, one will conclude from this that the content received was not watermarked.

In practice, this analysis is based on calculations relating to spectral analysis and the likelihood testing of hypotheses which are described in detail in the work by K. Dzhaparidze, "*Parameter Estimation and Hypothesis Testing in Spectral Analysis of Stationary Time Series*", Springer Series in Statistics, Springer-Verlag, 1986, to which reference may be made for further details.

Returning to FIG. 3, the sequence of received interleaved data $\tilde{r}$ is transmitted to a module 34 performing a Periodogram calculus. This calculus is aimed at estimating the power spectral density of the sequence $\tilde{r}$. A quantity $I_N(f)$ given by the following relation (8)

$$I_N(f) = \frac{1}{N}\left|\sum_{k=1}^{N} \tilde{r}_k \cdot \exp(2\pi j f k)\right|^2 \quad (8)$$

is obtained at output.

This quantity is then transmitted to a module 36 performing a MLR Hypothesis test so as to determine whether the content received is watermarked (output response "Y") or not (output response "N")

The module 36 tests the likelihood of two hypotheses:

according to the first hypothesis $G_0$, the content received is not watermarked, hence the spectral density of the sequence $\tilde{r}$ is substantially flat and can be estimated via the following relation (9):

$$g_0(f) = \sigma_r^2 + \mu_r^2 \cdot \delta(f) \quad (9)$$

according to the second hypothesis $G_1$, the content received is watermarked and the spectral density of the sequence $\tilde{r}$ can be estimated via the following relation (10):

$$g_1(f) = \mu_m^2 \cdot \sigma_r^2 \cdot |H(f)|^2 + C \quad (10)$$

in which C is a constant and $\sigma_v$ is equal to 1 (one preferably chooses the pseudo noise sequence v at the level of the insertion device so that $\sigma_v$ is equal to 1, but one may equally choose other values). Furthermore, $\mu_m$ is normed at the level of the insertion device and equals for example 3.

To estimate the likelihood of the hypotheses $G_0$ and $G_1$, the module 36 calculates two numbers $U_{N,0}(\tilde{r})$ and $U_{N,1}(\tilde{r})$ representing the likelihoods of the hypotheses $G_0$ and $G_1$ according to the following relation (11):

$$U_{N,1}(\tilde{r}) = -\int_{-\frac{1}{2}}^{\frac{1}{2}}\left(\log g_i(f) + \frac{I_N(f)}{g_i(f)}\right)df \text{ with } i \in \{0, 1\} \quad (11)$$

By then comparing these two numbers, the module 36 deduces from this:

if $U_{N,1}(\tilde{r}) > U_{N,0}(\tilde{r})$, then the response of the detector is "Y" signifying that the content received is watermarked; and if $U_{N,1}(\tilde{r}) < U_{N,0}(\tilde{r})$, then the response of the detector is "N" signifying that the content received is not watermarked.

It is also possible, in a preferential manner, to calculate the difference $(U_{N,1}(\tilde{r}) < U_{N,0}(\tilde{r}))$ and to perform the above comparisons only if this difference is greater than a predetermined threshold, this being so as to guarantee better exactness of detection.

Figure 4:
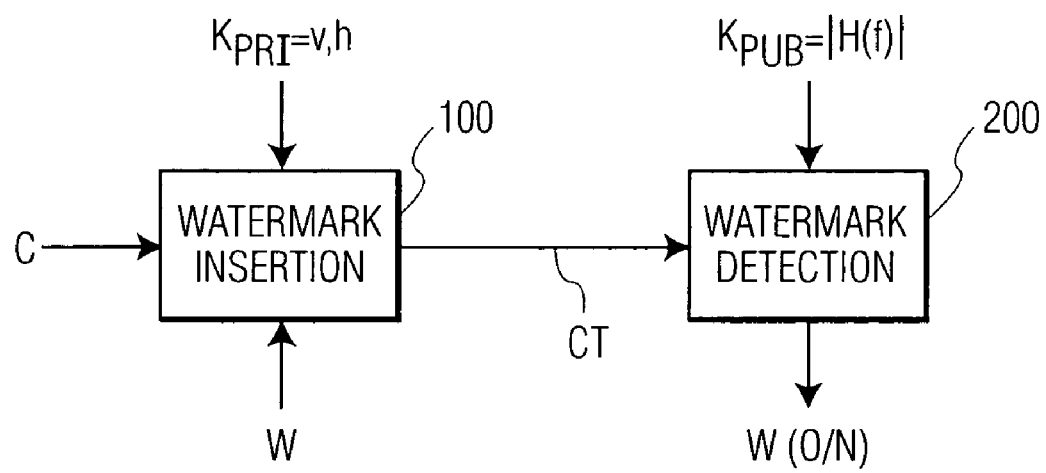
FIG. 4 illustrates a novel scheme for watermarking digital data according to the invention.

The watermark insertion and detection methods just described with reference to FIGS. 2 and 3 make it possible to produce a novel watermarking system which is illustrated by FIG. 4. In this novel system and according to a preferred aspect of the invention, a parameter which is referred to as the "private key" $K_{PRI}$ is used for the insertion (100) of a watermark W into a content C, whereas another parameter which is referred to as the "public key" $K_{PUB}$ is used for the detection (200) of a watermark in a content received CT. The terms "private key" and "public key" are used by analogy with public key crytographic systems. It will be noted that here the watermark W is binary, that is to say that, either the content C is watermarked, or it is not, but W does not contain any item of its own.

In the embodiment described above, the private key $K_{PRI}$ is formed by the pseudo random noise sequence v as well as by the impulse response h of the filter 16 (FIG. 2). The sequences $v=\{v_n\}$ and $h=\{h_n\}$ are in effect indispensable to the calculation of the sequence $w=\{w_n\}$ which is itself, after having been multiplied by the interleaved modulation sequence $\tilde{m}$, inserted into the data representing the content to be protected.

The public key used to detect the watermark in the content received is for its part formed from the modulus of the spectral response of the filter 16 $|H(f)|$. Indeed, in the spectral analysis calculations performed (modules 34 and 36 of FIG. 3) to detect the presence of a watermark in a content received CT, only the knowledge of $|H(f)|$ is necessary. In particular, it is not necessary to know v and h (the private key) to perform the detection of the watermark. In actual fact, as was seen earlier in the description, the knowledge of $|H(f)|$ does not suffice to know $H(f)$ and hence h.

A system is therefore obtained in which knowledge of the public key does not make it possible to deduce the private key from this. Also, not knowing the private key, it is impossible for the device performing the detection of the watermark to delete it or to modify it. The detection can therefore be performed in a non-secure environment with no risk of the watermark being erased.

What is claimed is:

1. A method for inserting a watermark into data (x) representing a content to be protected, comprising the steps of:
    a) generating, from said data (x), a modulation sequence (m) representing the maximum amount of noise which can be added to said data,
    b) supplying a pseudo random noise sequence (v) to the input of a filter with predefined impulse response (h);
    c) multiplying said filtered pseudo noise sequence (w) with said modulation sequence; and
    d) adding the filtered pseudo noise sequence (w) multiplied by the modulation sequence to said data.

2. The method according to claim 1, further comprising the steps of:
    e) performing a pseudo-random interleaving (p) of the modulation sequence (m) before step c)

f) performing the pseudo random interleaving (p) of the data (x) before step d); and g) performing an inverse interleaving after step d) so as to obtain the watermarked data.

3. A method for detecting a watermark in data (r) representing a content received, comprising the steps of:
   i) performing a spectral analysis of said data;
   ii) estimating therefrom whether said data include a pseudo noise sequence which has been filtered by a filter with predefined spectral response (H(f)); and
   iii) deducing from said estimation the presence of said watermark.

4. The method according to claim 3 for detecting a watermark in data (r) representing a content received, the watermark being adapted to be inserted in data (x) to be protected after performing a pseudo random interleaving (p) of said data to be protected, further comprising:
   iv) performing, before step i), the pseudo random interleaving (p) of the data (r) received.

5. A device for inserting a watermark into data (x) representing a content to be protected, comprising:
   means for generating a pseudo random noise sequence (v);
   means for generating, from said data (x), a modulation sequence (m) indicative of the maximum amount of noise which can be added to said data;
   filtering means having a predefined impulse response (h) and which are adapted for receiving said pseudo noise sequence (v) and for supplying a filtered pseudo noise sequence (w);
   multiplication means for multiplying said filtered pseudo noise sequence (w) with said modulation sequence; and
   means for adding the filtered pseudo noise sequence (w) multiplied by the modulation sequence (m) to said data (x).

6. The device according to claim 5, further comprising:
   first means of pseudo random interleaving of the data (x) representative of the content to be protected so as to supply interleaved data ($\tilde{x}$),
   second means of pseudo random interleaving, adapted for performing the same interleaving as said first means of pseudo random interleaving, and adapted for receiving said modulation sequence (m) so as to supply an interleaved modulation sequence ($\tilde{m}$), said interleaved modulation sequence being supplied to the multiplication means for multiplication with said filtered pseudo noise sequence (w);
   wherein the interleaved data are supplied to the addition means so as to be added to the filtered pseudo noise sequence (w) multiplied by the interleaved modulation sequence ($\tilde{m}$); and
   means of inverse interleaving of said first interleaving means, linked to the output of said addition means so as to supply the watermarked data.

7. The device according to claim 6, further comprising:
   means for transforming the content to be protected into data (x) representative of said content;
   means of inverse transformation of the watermarked data into a marked content.

8. A device for detecting a watermark in data (r) representing a content received, comprising:
   means for obtaining the power spectral density of said data;
   means of likelihood testing of hypotheses so as to estimate whether said data include a pseudo noise sequence which has been filtered by a filter with predefined spectral response (H(f)); and
   means for deducing from said estimation the presence of said watermark.

9. The device according to claim 8, adapted for detecting a watermark inserted by an insertion device, said insertion device comprising means of pseudo random interleaving of the data (x) to be protected so as to supply interleaved data ($\tilde{x}$) and means for inserting said watermark in said interleaved data ($\tilde{x}$) wherein the detection device furthermore comprises:
   means of pseudo random interleaving of the data (r) representing the content received, which are adapted for performing the same interleaving (p) as said interleaving means of the insertion device, said interleaved data ($\tilde{r}$) being supplied to said means for obtaining the power spectral density.

10. The device according to claim 9, adapted for detecting a watermark inserted by an insertion device further comprising means for transforming the content to be protected into data (x) representative of said content wherein said detection device furthermore comprises:
   means for transforming the content received into data (r) representative of said content, said transforming means being adapted for performing the same transformation as the transforming means of the insertion device.

* * * * *